US010681598B1

(12) United States Patent
Sitaram et al.

(10) Patent No.: US 10,681,598 B1
(45) Date of Patent: Jun. 9, 2020

(54) WIRELESS COMMUNICATIONS WITH DYNAMIC DATA SPLITTING BETWEEN FIFTH GENERATION NEW RADIO (5GNR) AND LONG TERM EVOLUTION (LTE)

(71) Applicant: Sprint Communications Company L.P., Overland Park, KS (US)

(72) Inventors: Krishna D. Sitaram, Chantilly, VA (US); Shilpa Kowdley Srinivas, Brambleton, VA (US); Hemanth Balaji Pawar, Brambleton, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 16/546,725

(22) Filed: Aug. 21, 2019

(51) Int. Cl.
*H04W 36/00* (2009.01)
*H04W 36/30* (2009.01)
*H04W 36/26* (2009.01)
*H04W 36/22* (2009.01)

(52) U.S. Cl.
CPC . *H04W 36/00837* (2018.08); *H04W 36/0069* (2018.08); *H04W 36/22* (2013.01); *H04W 36/26* (2013.01); *H04W 36/30* (2013.01)

(58) Field of Classification Search
CPC ........... H04W 36/00835; H04W 36/08; H04W 36/0022; H04W 36/0033; H04W 36/0061; H04W 36/04; H04W 36/14; H04W 36/32; H04W 36/36
See application file for complete search history.

(56) References Cited

U.S. PATENT DOCUMENTS

| 10,251,082 | B2 | 4/2019 | Gu et al. |
| 10,476,577 | B1* | 11/2019 | Wang .................. H04B 7/0417 |
| 2018/0368199 | A1 | 12/2018 | Zeng et al. |
| 2019/0149184 | A1 | 5/2019 | Jung et al. |
| 2019/0159274 | A1 | 5/2019 | Hong et al. |
| 2019/0313380 | A1* | 10/2019 | Ye ......................... H04W 48/10 |

FOREIGN PATENT DOCUMENTS

| WO | 2018004278 A1 | 1/2018 |
| WO | 2018226065 A1 | 12/2018 |
| WO | 2019050215 A1 | 3/2019 |
| WO | 2019119338 A1 | 6/2019 |

OTHER PUBLICATIONS

Jian Zhang, et al.; "LTE Small Cell Enhancement by Dual Connectivity"; Outlook, Visions and research directions for the Wireless World; Nov. 2014; pp. 1-21; No. 15; Wireless World Research Forum; Zurich, Switzerland.

* cited by examiner

Primary Examiner — Diane D Mizrahi

(57) ABSTRACT

A wireless communication network serve User Equipment (UEs) over Fifth Generation New Radio (5GNR) and Long Term Evolution (LTE). A 5GNR access node receive user data for wireless delivery to the UEs and splits the user data into LTE and 5GNR portions. The 5GNR access node transfers the 5GNR portion to the UEs over 5GNR links and transfers the LTE portion to an LTE access node over X2 links. The LTE access node transfers the LTE portion to the UEs over LTE links. The 5GNR access node identifies X2 link quality. When the X2 link experiences low quality, the 5GNR access node transfers user data to the UEs over 5GNR links without splitting the data to LTE. When the X2 link status has adequate quality, then the 5GNR access node starts splitting user data to LTE again.

20 Claims, 8 Drawing Sheets

US 10,681,598 B1

WIRELESS COMMUNICATIONS WITH DYNAMIC DATA SPLITTING BETWEEN FIFTH GENERATION NEW RADIO (5GNR) AND LONG TERM EVOLUTION (LTE)

TECHNICAL BACKGROUND

Wireless communication networks provide wireless data services to wireless user devices. Exemplary wireless data services include voice-calling, internet-access, media-streaming, machine communications, vehicle control, and social-networking. Exemplary wireless user devices comprise phones, computers, vehicles, robots, sensors, and drones. The wireless communication networks have wireless access nodes that exchange wireless signals with the wireless user devices using wireless network protocols. Exemplary wireless network protocols include Long Term Evolution (LTE) and Fifth Generation New Radio (5GNR). LTE is described in Third Generation Partnership Project Technical Specification 36. 5GNR is described in Third Generation Partnership Project Technical Specification 38.

In some wireless network deployments, a single wireless user device uses both LTE and 5GNR simultaneously. With these "dual-connection" user devices, the wireless communication network uses an LTE access node to exchange network signaling and user data with the wireless user device. For the "dual-connection" user devices, the wireless communication network also uses a 5GNR access node to receive user data from a wireless network core and transfer the user data to the wireless user device. Thus, the 5GNR access node handles part of the user downlink, and the LTE access node handles network signaling, the user uplink, and the other part of the user downlink.

To improve spectral efficiency, the 5GNR access node splits out a portion of the downlink user data for the LTE access node to deliver. The 5GNR access node transfers the LTE data portion to the LTE access node over an X2 link, and the LTE access node wirelessly transfers the LTE data portion to the wireless user device over LTE. Unfortunately, the X2 link is also used to transport network signaling and user data—especially for wireless user device handovers. Although the use of the X2 links to transfer user data for "dual-connected" user devices does improve spectral efficiency, this use of X2 links for "dual-connected" user devices also causes dropped or incoherent connections when the X2 links become congested—especially during wireless user device handovers.

TECHNICAL BACKGROUND

A wireless communication network serve User Equipment (UEs) over Fifth Generation New Radio (5GNR) and Long Term Evolution (LTE). A 5GNR access node receive user data for wireless delivery to the UEs and splits the user data into LTE and 5GNR portions. The 5GNR access node transfers the 5GNR portion to the UEs over 5GNR links and transfers the LTE portion to an LTE access node over X2 links. The LTE access node transfers the LTE portion to the UEs over LTE links. The 5GNR access node identifies X2 link quality. When the X2 link has low quality, then the 5GNR access node transfers user data to the UEs over 5GNR links without splitting the data to LTE. When the X2 link status has adequate quality, then the 5GNR access node starts splitting user data to LTE again.

DETAILED DESCRIPTION

Figure 1:
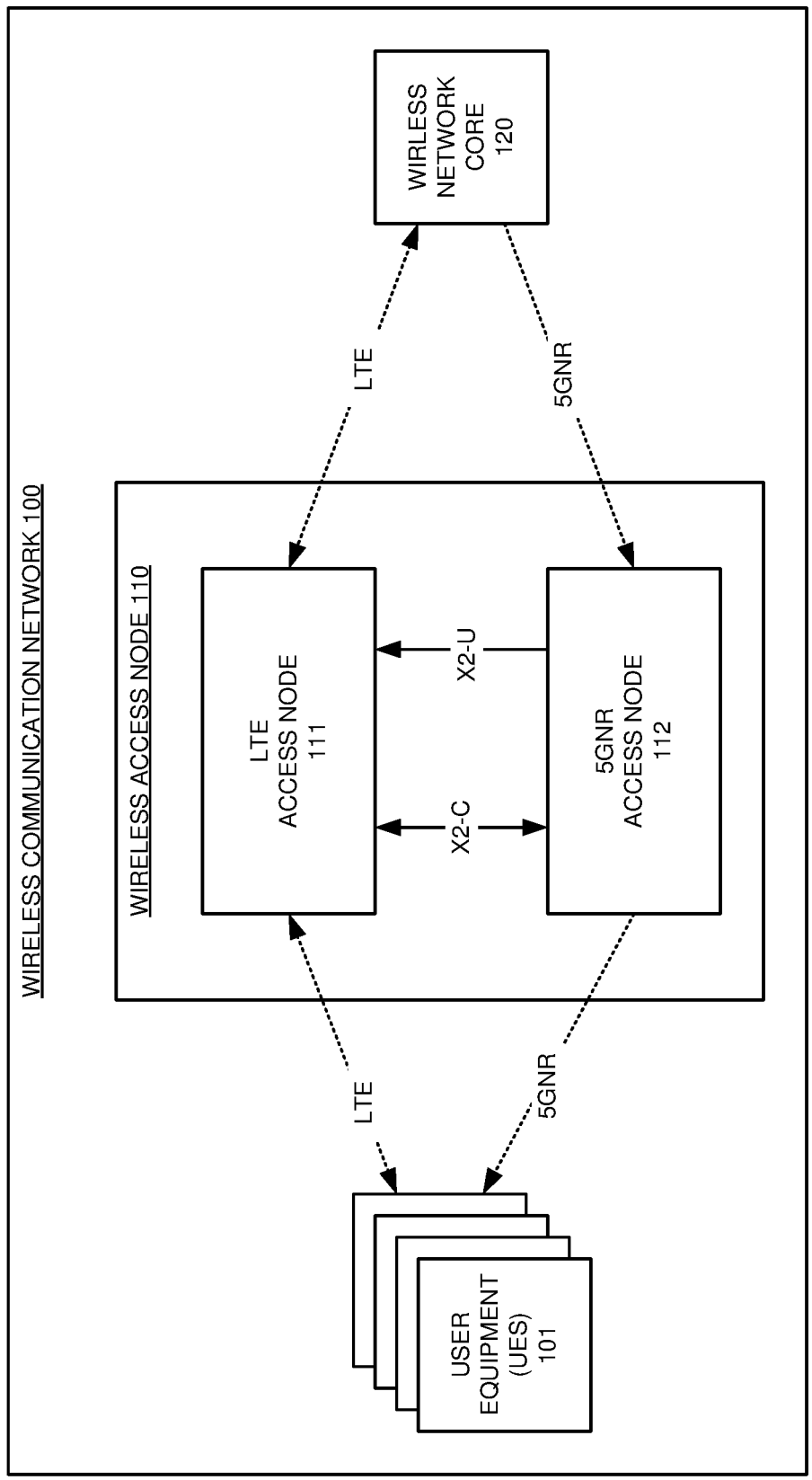
FIG. 1 illustrates a wireless communication network to serve User Equipment (UEs) with dynamic data splitting over Fifth Generation New Radio (5GNR) and Long Term Evolution (LTE).

FIG. 1 illustrates wireless communication network 100 to serve User Equipment (UEs) 101 with dynamic data splitting over Fifth Generation New Radio (5GNR) and Long Term Evolution (LTE). LTE is an Orthogonal Frequency Division Multiplex (OFDM) Wide Area Network (WAN) radio technology that serves mobile devices with services like internet access, machine communications, or some other user applications. LTE is described by the Third Generation Partnership Project Technical Specification 36. 5GNR is an OFDM WAN radio technology that provides an extension to LTE. 5GNR is described in Third Generation Partnership Project Technical Specification 38. LTE and 5GNR may use frequencies in the low-band, mid-band, millimeter-wave band, and/or some other part of the wireless spectrum.

Wireless communication network 100 comprises User Equipment (UEs) 101, wireless access node 110, and network elements 120. Wireless access node 110 comprises LTE access node 111 and 5GNR access node 112. LTE access node 111 is coupled to UEs 101 over wireless LTE links. 5GNR access node 112 is coupled to UEs 101 over wireless 5GNR links. LTE access node 111 is coupled to wireless network core 120 over wireless and/or wireline LTE links. 5GNR access node 112 is coupled to wireless network core 120 over wireless and/or wireline 5GNR links. Wireless communication network 100 is restricted for clarity and typically includes more UEs and wireless access nodes than the number shown.

UEs 101 comprise radio circuitry and user circuitry that interact with users and that communicate with wireless communication networks. UEs 101 might be phones, computers, robots, sensors, vehicles, drones, data appliances, or some other user apparatus with wireless communication circuitry. UEs 101 exchange network signaling and user data with wireless access node 110 over the LTE and 5GNR links. Wireless access node 110 exchanges network signaling and user data with wireless network core 120 over the LTE and 5GNR links.

Wireless network core 120 comprises computer equipment with wireless network software. Wireless network core 120 may include a Mobility Management Entity (MME), Home Subscriber System (HSS), Serving Gateway (SGW), Packet Data Network Gateway (PGW), Access and Mobility Management Function (AMF), Session Management Function (SMF), Policy Control Function (PCF), User Plane Function (UPF), and/or some other networking components. Wireless network core 120 exchanges network signaling and user data with wireless access node 120 over the LTE and 5GNR links.

Wireless access node 110 comprises LTE access node 111 and 5GNR access node 112. LTE access node 111 and 5GNR access node 112 are coupled over X2 data links. The X2 data links may use Institute of Electrical and Electronic Engineer (IEEE) 802.3 (Ethernet), Internet Protocol (IP), Inter-Processor Communication (IPC), bus interfaces, or some other data communication protocol that transports X2 signaling. Access nodes 111-112 comprise antennas, modulators, amplifiers, filters, digital/analog interfaces, microprocessors, memory, software, transceivers, and bus connections. The microprocessors comprise Digital Signal Processors (DSPs), Central Processing Units (CPUs), Graphical Processing Units (GPUs), Field Programmable Gate Arrays (FPGAs), Application-Specific Integrated Circuits (ASICs), and/or the like. The memory comprises Random Access Memory (RAM), flash circuitry, disk drives, and/or the like. The memory stores software like operating systems, network applications, and virtual components. Exemplary network applications comprise Physical Layer (PHY), Media Access Control (MAC), Radio Link Control (RLC), Packet Data Convergence Protocol (PDCP), Radio Resource Control (RRC), and Service Data Adaptation Protocol (SDAP), although other network applications could be used. The microprocessors execute the operating systems and network applications to wirelessly exchange network signaling and user data with UEs 101 over the LTE and 5GNR links. The microprocessors execute the operating systems and network applications to exchange network signaling and user data with wireless network core 120. Wireless network core 120 exchanges some user data with external systems.

LTE access node 111 and 5GNR access node 112 exchange network signaling over the X2 Control (X2-C) links. 5GNR access node 112 receives user data for wireless delivery to UEs 101. 5GNR access node 112 splits the user data into an LTE portion and a 5GNR portion. The split may be based on a percentage allocations for LTE/5GNR like 30/70, 50/50, or 60/40. 5GNR access node 112 transfers the 5GNR portion of the user data to UEs 101 over the wireless 5GNR links. 5GNR access node 112 transfers the LTE portion of the user data to LTE access node 111 over X2 User (X2-U) links. LTE access node 111 receives the LTE portion of the user data over the X2-U links and transfers the LTE portion to UEs 101 over the wireless LTE links.

5GNR access node 112 identifies when X2 link status falls below a quality threshold. For example, 5GNR access node 112 may monitor the data occupancy of the X2-U and X2-C links to detect when their data occupancy exceeds 90% which correlates to an overload condition and low link quality. In another example, 5GNR access node 112 may monitor the average data throughput of the X2-U and X2-C links to detect when their average data throughput exceeds an amount that correlates to an overload condition and low link quality. In another example, 5GNR access node 112 may monitor the error messages or retransmissions for the X2-U and X2-C links to detect when their errors and/or retransmits exceeds a quantity that indicates low quality links. In some examples, LTE access node 111 detects and indicates X2 link status to 5GNR access node 112, and 5GNR access node 112 determines link status in this manner. In other examples, LTE access node 111 detects and indicates low quality X2 link status to 5GNR access node 112 which then detects the low quality X2 link status based on the indication. When the X2 link status falls below the quality threshold, 5GNR access node 112 receives user data and transfers the user data to UEs 101 over the wireless 5GNR links, but 5GNR access node 112 does not split user data to LTE access node 111. LTE access node 111 and 5GNR access node 112 still exchange network signaling over the X2-C links when the X2 link status falls below the quality threshold.

5GNR access node 112 also identifies when the X2 link status rises above the quality threshold. When the X2 link status rises above the quality threshold, 5GNR access node 112 receives user data for wireless delivery to UEs 101 and splits the user data into an LTE portion and a 5GNR portion. 5GNR access node 112 transfers the 5GNR portion of the user data to UEs 101 over the wireless 5GNR links. 5GNR access node 112 transfers the LTE portion of the user data to LTE access node 111 over the X2-U links. LTE access node 111 receives the LTE portion of the user data over the X2-U links and transfers the LTE portion of the user data to UEs 101 over the wireless LTE links. LTE access node 111 and 5GNR access node 112 continue to exchange network signaling over the X2-C links after the X2 link status rises above the quality threshold.

In some examples, 5GNR access node 112 transfers network signaling to a wireless network controller in wireless network core 120 to indicate to the network controller when 5GNR access node 112 splits user data and when 5GNR access node 112 does not split user data. In some examples, 5GNR access node 112 stops splitting user data that has a specific quality-of-service level in response to poor X2 link quality, but 5GNR access node 112 continues to split other user data. For example, 5GNR access node 112 may stop splitting non-Guaranteed Bit Rate (non-GBR) data in response to poor X2 link quality but continue to split Guaranteed Bit Rate (GBR) data. Advantageously, wireless access node 110 selectively uses the X2 links to transfer user data for "dual-connected" LTE/5GNR UEs to improve spectral efficiency, but wireless access node 110 also protects the quality of the X2 links to mitigate dropped and incoherent connections—especially during wireless user device handovers.

Figure 2:
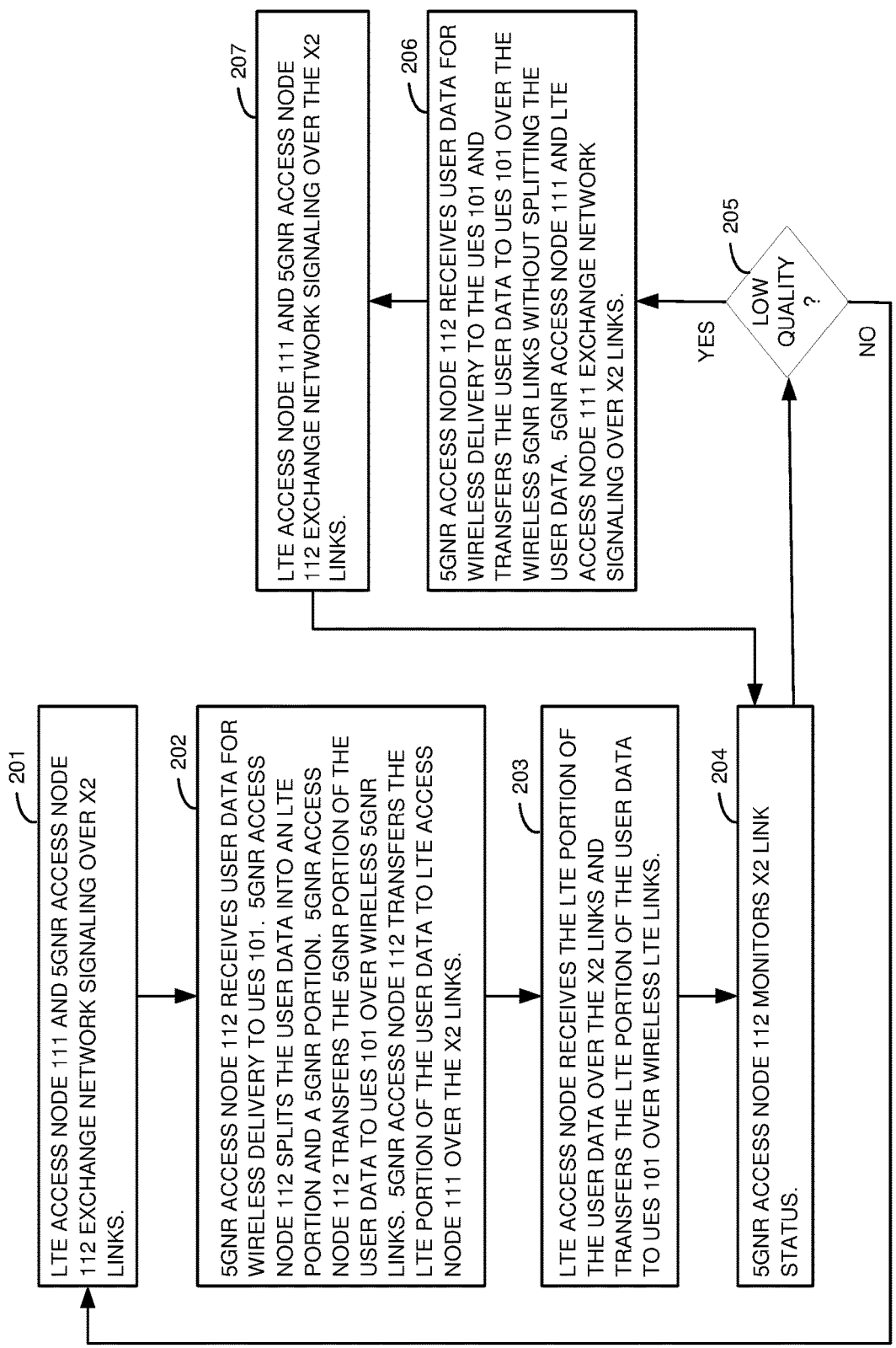
FIG. 2 illustrates the operation of the wireless communication network to serve the UEs with dynamic data splitting over 5GNR and LTE.

FIG. 2 illustrates the operation of wireless communication network 100 to serve UEs 101 with dynamic data splitting over 5GNR and LTE. LTE access node 111 and 5GNR access node 112 exchange network signaling over the X2 links (201). 5GNR access node 112 receives user data for wireless delivery to UEs 101 (202). 5GNR access node 112 splits the user data into an LTE portion and a 5GNR portion (202). 5GNR access node 112 transfers the 5GNR portion to UEs 101 over the wireless 5GNR links (202). 5GNR access node 112 transfers the LTE portion to LTE access node 111 over the X2 links (202). LTE access node 111 receives the LTE portion over the X2-U links and transfers the LTE portion to UEs 101 over the wireless LTE links (203).

5GNR access node 112 monitors X2 link status—possibly with the help of LTE access node 111 (204). 5GNR access node 112 might monitor occupancy, throughput, latency, errors, or some other quality metrics for the X2 links. 5GNR access node 112 detects when the X2 link status qualifies as low quality (205). For example, the occupancy, throughput, latency, errors and/or other metrics may exceed corresponding low-quality thresholds—including combinations thereof. This operation repeats (201-205) until X2 link status qualifies as low quality.

When X2 link status qualifies as low quality (205), 5GNR access node 112 receives user data for wireless delivery to UEs 101 and transfers the user data to UEs 101 over the wireless 5GNR links, but 5GNR access node 112 does not split the user data to LTE access node 111 (206). LTE access node 111 and 5GNR access node 112 still exchange network signaling over the X2 links when the X2 link status qualifies as low quality (207). This operation repeats (204-207) until the X2 link status no longer qualifies as low quality, and then the initial operation restarts (201-205).

Figure 3:
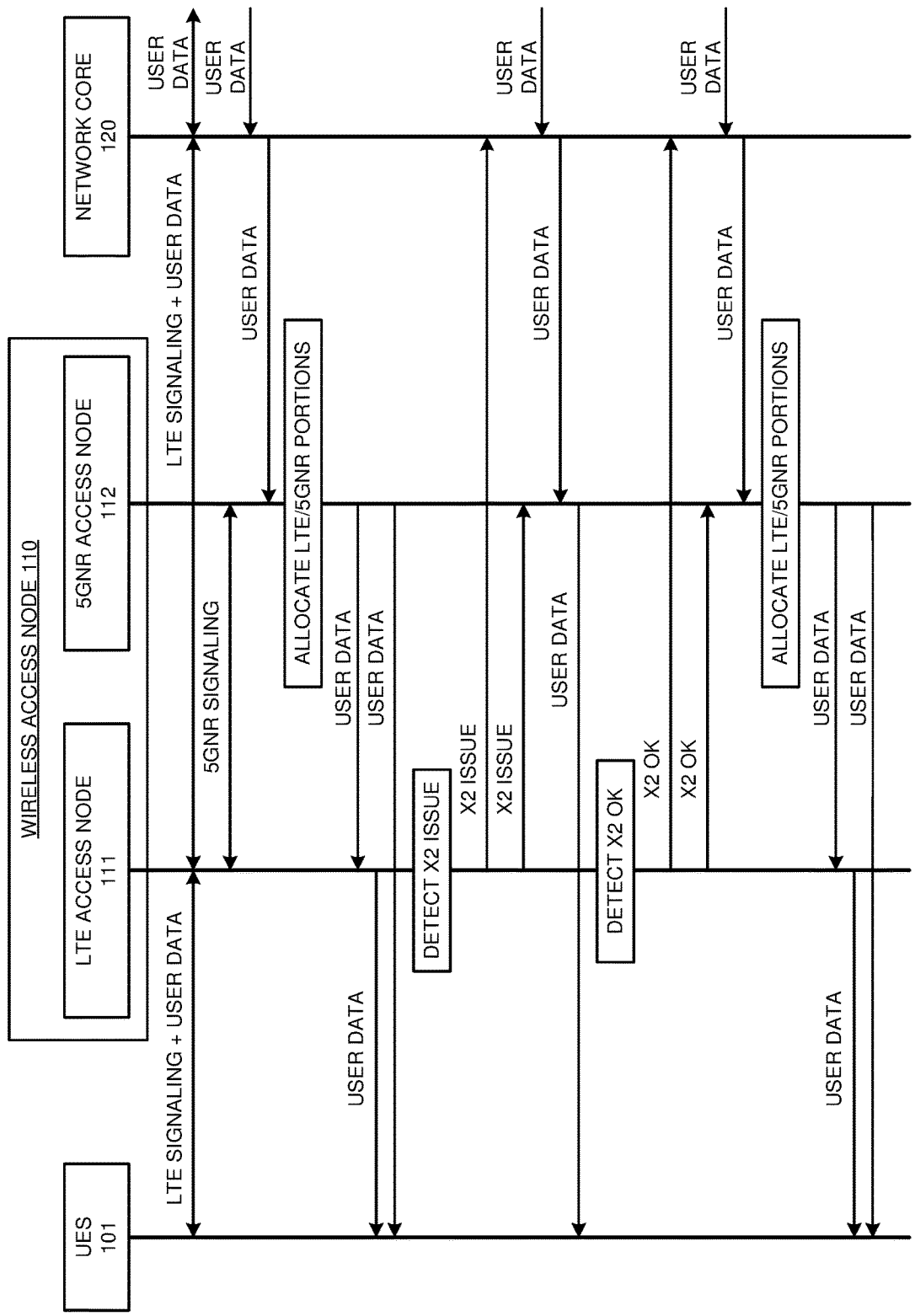
FIG. 3 illustrates the operation of the wireless communication network to serve the UEs with dynamic data splitting over 5GNR and LTE.

FIG. 3 illustrates the operation of wireless communication network 100 to serve UEs 101 with dynamic data splitting over 5GNR and LTE. UEs 101 and LTE access node 111 wirelessly exchange LTE signaling and user data. LTE access node 111 and wireless network core 120 exchange LTE signaling and user data. Wireless network core 120 exchanges user data with external systems. LTE access node 111 and 5GNR access node 112 exchange network signaling over the X2 links.

Wireless network core 120 receives user data for UEs 101 and transfer the user data to 5GNR access node 112. 5GNR access node 112 allocates the user data into LTE and 5GNR portions. 5GNR access node 112 transfers the LTE portion of the user data to LTE access node 111 over X2 links. LTE access node 111 receives the LTE portion of the user data and wirelessly transfers the LTE portion of the user data to UEs 101. 5GNR access node 112 wirelessly transfers the 5GNR portion of the user data to UEs 101.

LTE access node 111 detects an X2 link quality issue like overload, incoherence, and the like. In response to the X2 link quality issue, LTE access node 111 signals wireless network core 120 and 5GNR access node 112 to indicate the X2 quality issue. 5GNR access node 112 receives user data for UEs 101. In response to the X2 quality issue, 5GNR access node 112 wirelessly transfers the user data to UEs 101 but does not split the user data to LTE access node 111.

LTE access node 111 subsequently detects when X2 link quality no longer qualifies as low. In response to the adequate link quality, LTE access node 111 signals wireless network core 120 and 5GNR access node 112 to indicate the adequate X2 link quality. Wireless network core 120 receives user data for UEs 101 and transfers the user data to 5GNR access node 112. In response to the adequate X2 quality, 5GNR access node 112 again allocates the user data into LTE and 5GNR portions. 5GNR access node 112 transfers the LTE portion of the user data to LTE access node 111 over the X2 links. LTE access node 111 receives the LTE portion of the user data and wirelessly transfers the LTE portion of the user data to UEs 101. 5GNR access node 112 wirelessly transfers the 5GNR portion of the user data to UEs 101.

Figure 4:
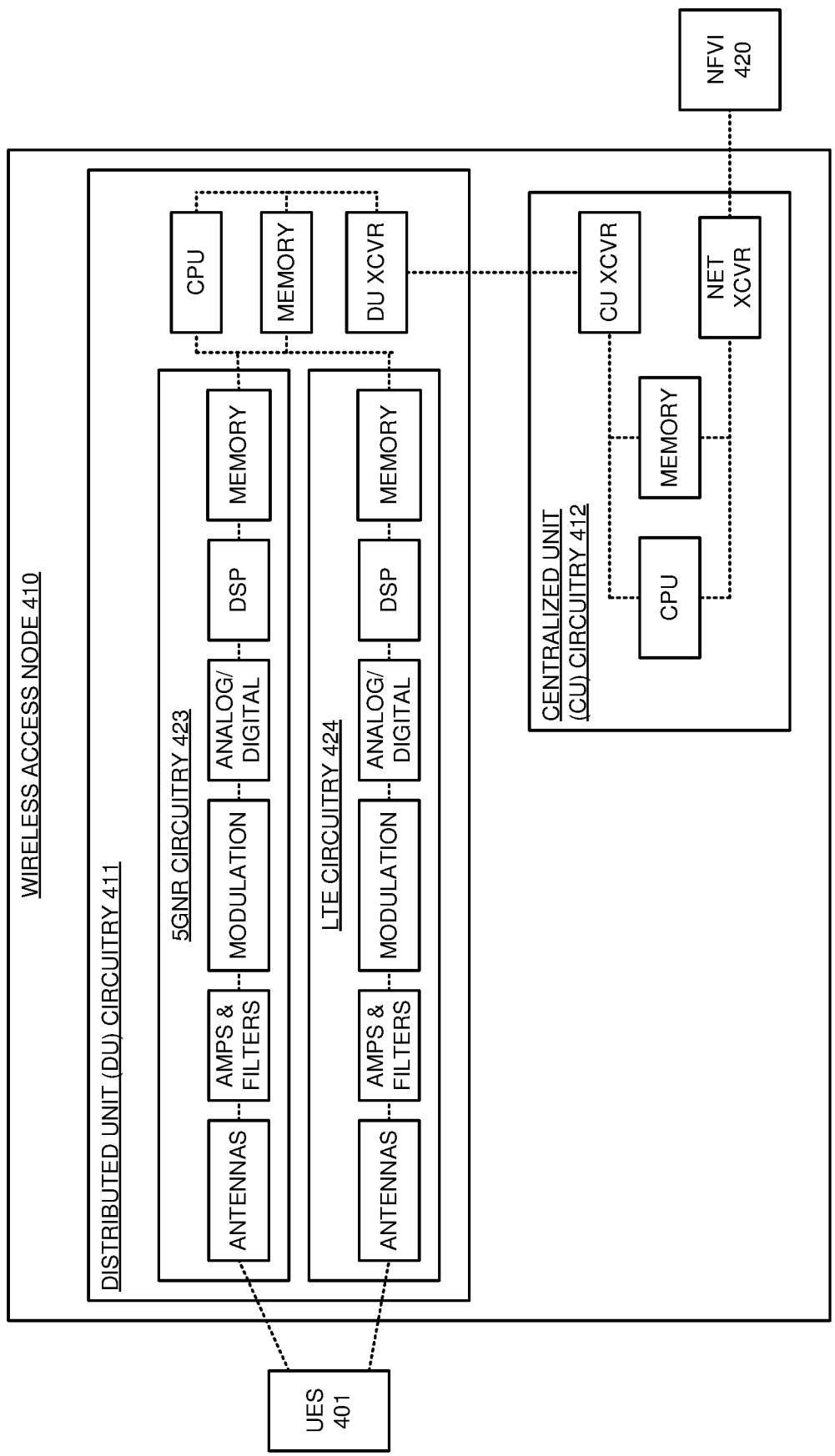
FIG. 4 illustrates a wireless access node to serve UEs with dynamic data splitting over 5GNR and LTE.

FIG. 4 illustrates wireless access node 410 to serve UEs 401 with dynamic data splitting over 5GNR and LTE. Wireless access node 410 is an example of wireless access node 110, although access node 110 may differ. Wireless access node 410 comprises Distributed Unit (DU) circuitry 411 and Centralized Unit (CU) circuitry 412. DU circuitry 411 comprises 5GNR circuitry 423, LTE circuitry 424, Central Processing Units (CPU), memory, and transceivers (DU XCVR) that are coupled over bus circuitry. Circuitry 423-424 comprises antennas, amplifiers (AMPS), filters, modulation, analog-to-digital interfaces, Digital Signal Processors (DSP), and memory that are coupled over bus circuitry. Circuitry 423-424 may share some radio components. CU circuitry 412 comprises CPU, memory, and transceivers that are coupled over bus circuitry. UEs 401 are wirelessly coupled to the antennas in circuitry 423-424 over wireless LTE and 5GNR links. The DU transceivers in DU circuitry 411 are coupled to the CU transceivers in CU circuitry 412 over network data links. The network transceivers in CU circuitry 412 are coupled to Network Function Virtualization Infrastructure (NFVI) 420 over network data links.

In DU circuitry 411, the memories store operating systems and network applications. The network applications include at least some of: Physical Layer (PHY), Media Access Control (MAC), Radio Link Control (RLC), Packet Data Convergence Protocol (PDCP), Radio Resource Control (RRC), Service Data Adaptation Protocol (SDAP), and Common Public Radio Interface (CPRI). In CU circuitry 412, the memories store operating systems, virtual components, and network applications. The virtual components comprise hypervisor modules, virtual switches, virtual machines, and/or the like. The network applications comprise PHY, MAC, RLC, PDCP, RRC, SDAP, and CPRI. The 5GNR PDCP and the LTE PDCP are coupled over X2 links.

For 5GNR, and the CPU in CU circuitry 412 executes some or all of the 5GNR network applications to drive the transfer of 5GNR data from NFVI 420 to DU circuitry 411, and the CPU in DU circuitry 411 executes some or all of the 5GNR network applications to drive the transfer of 5GNR data from CU circuitry 412 to UEs 401. The functionality split of the 5GNR network applications between DU circuitry 411 and CU circuitry 412 may vary. For LTE, the CPU in DU circuitry 411 executes a CPRI application, and the CPU in CU circuitry 412 executes the LTE network applications to drive the exchange of LTE data between UEs 401 and NFVI 420.

In LTE circuitry 424, the antennas receive wireless signals from UEs 401 that transport UL LTE signaling and user data. The antennas transfer corresponding electrical UL signals through duplexers to the amplifiers. The amplifiers boost the received UL signals for filters which attenuate unwanted energy. In modulation, demodulators down-convert the UL signals from their carrier frequencies. The analog/digital interfaces convert the analog UL signals into digital UL signals for the DSP. The DSP recovers UL LTE symbols from the UL digital signals. In DU circuitry 411, the CPRI application and the DU transceivers transfer the UL LTE symbols to CU circuitry 412. In CU circuitry 412, the CPUs execute the LTE network applications to process the UL LTE symbols and recover the UL LTE signaling and user data.

In CU circuitry 412, the network transceivers receive Downlink (DL) LTE signaling and user data from NFVI 420 for LTE circuitry 423 and transfer the DL LTE signaling and user data to memory. The CPU in CU circuitry 412 executes the LTE network applications to process the UL LTE signaling and the DL LTE signaling to generate new UL LTE signaling, new DL LTE signaling, and new 5GNR signaling. The CPU also executes the LTE network applications to determine X2 link quality like data occupancy and throughput metrics. In CU circuitry 412, the network transceivers transfer the new UL LTE signaling and user data to NFVI 420. The LTE network applications in CU circuitry 412 transfer 5GNR signaling to the 5GNR network applications in CU circuitry 412 or DU circuitry 411. In CU circuitry 411, the LTE network applications process the new DL LTE signaling and user data to generate new DL LTE symbols that carry the new DL LTE signaling and user data. The CU transceiver transfers the new DL LTE symbols to the DU transceiver.

In LTE circuitry 424, the DSP processes the DL LTE symbols to generate corresponding digital signals for the analog-to-digital interfaces. The analog-to-digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport the DL LTE signaling and user data to UEs 401.

In CU circuitry 412, the network transceivers receive DL user data from NFVI 420 for the 5GNR network applications to transfer to UEs 401. In CU circuitry 412 and/or DU circuitry 411, the CPUs execute the 5GNR network applications to determine X2 link quality. When X2 link quality is adequate, the CPUs execute the 5GNR network applications to split the DL user data into an LTE portion and a 5GNR portion. In CU circuitry 412 and/or DU circuitry 411, the CPUs execute the 5GNR network applications to transfer the LTE portion of the DL 5GNR data to the LTE applications (typically from the 5GNR PDCP to the LTE RLC). In CU circuitry 412 and/or DU circuitry 411, the CPUs execute the 5GNR network applications to generate DL 5GNR symbols that carry the 5GNR portion of the DL user data.

When X2 quality is low, the CPUs execute the 5GNR network applications to generate DL 5GNR symbols that carry the 5GNR portion of the DL user data, but the 5GNR network applications do not split user data toward LTE. In some examples, the 5GNR network applications still split some special user data having a particular quality-of-service when the X2 link quality is low, although the 5GNR network applications still stop splitting other user data having different quality-of-service levels when the X2 link quality is low In 5GNR circuitry 423, the DSP processes the DL 5GNR symbols for the DL user data portion to generate corresponding digital signals for the analog-to-digital interfaces. The analog-to-digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the filtered DL signals through duplexers to the antennas. The electrical DL signals drive the antennas to emit corresponding wireless 5GNR signals that transport the DL user data to UEs 401 over 5GNR links.

In LTE circuitry 424, the DSP processes the DL LTE symbols for the LTE portion of the DL user data to generate corresponding digital signals for the analog-to-digital interfaces. The analog-to-digital interfaces convert the digital DL signals into analog DL signals for modulation. Modulation up-converts the DL signals to their carrier frequencies. The amplifiers boost the modulated DL signals for the filters which attenuate unwanted out-of-band energy. The filters transfer the filtered DL signals through duplexers to the antennas. The electrical DL signals drive the antennas to emit corresponding wireless LTE signals that transport DL LTE signaling, DL LTE data, and the LTE portion of the DL user data to UEs 401.

The RRC maps between network signaling/user data and Service Data Units (SDUs). The RRC exchanges the SDUs with the LTE PDCP. The LTE PDCP and the 5GNR PDCP map between the SDUs and PDUs. The PDCPs exchanges their PDUs with the RLCs. In particular, the 5GNR PDCP receives user data from NFVI 420 and transfers PDUs to the LTE RLC that carry the LTE portion of the DL user data. The RLCs map between the PDUs and MAC logical channels. The RLCs exchanges the network signaling and user data with the MACs over the MAC logical channels. The MACs map between the MAC logical channels and MAC transport channels. The MACs exchanges the network signaling and user data with the PHYs over the MAC transport channels. The PHYs maps between the MAC transport channels and PHY transport channels. The PHYs exchange the network signaling and user data with the PHYs in the UE 401 over the PHY transport channels in the wireless links.

RRC functions comprise authentication, security, handover control, status reporting, Quality-of-Service (QoS), network broadcasts and pages, and network selection. SDAP functions comprise QoS marking and flow control. PDCP functions comprise LTE/5GNR allocations, security ciphering, header compression and decompression, sequence numbering and re-sequencing, de-duplication. RLC functions comprise Automatic Repeat Request (ARQ), sequence numbering and resequencing, segmentation and resegmentation. MAC functions comprise buffer status, power control, channel quality, Hybrid Automatic Repeat Request (HARM), user identification, random access, user scheduling, and QoS. PHY functions comprise packet formation/deformation, windowing/de-windowing, guard-insertion/guard-deletion, parsing/de-parsing, control insertion/removal, interleaving/de-interleaving, Forward Error Correction (FEC) encoding/decoding, rate matching/de-matching, scrambling/descrambling, modulation mapping/de-mapping, channel estimation/equalization, Fast Fourier Transforms (FFTs)/Inverse FFTs (IFFTs), channel coding/decoding, layer mapping/de-mapping, precoding, Discrete Fourier Transforms (DFTs)/Inverse DFTs (IDFTs), and Resource Element (RE) mapping/de-mapping.

Figure 5:
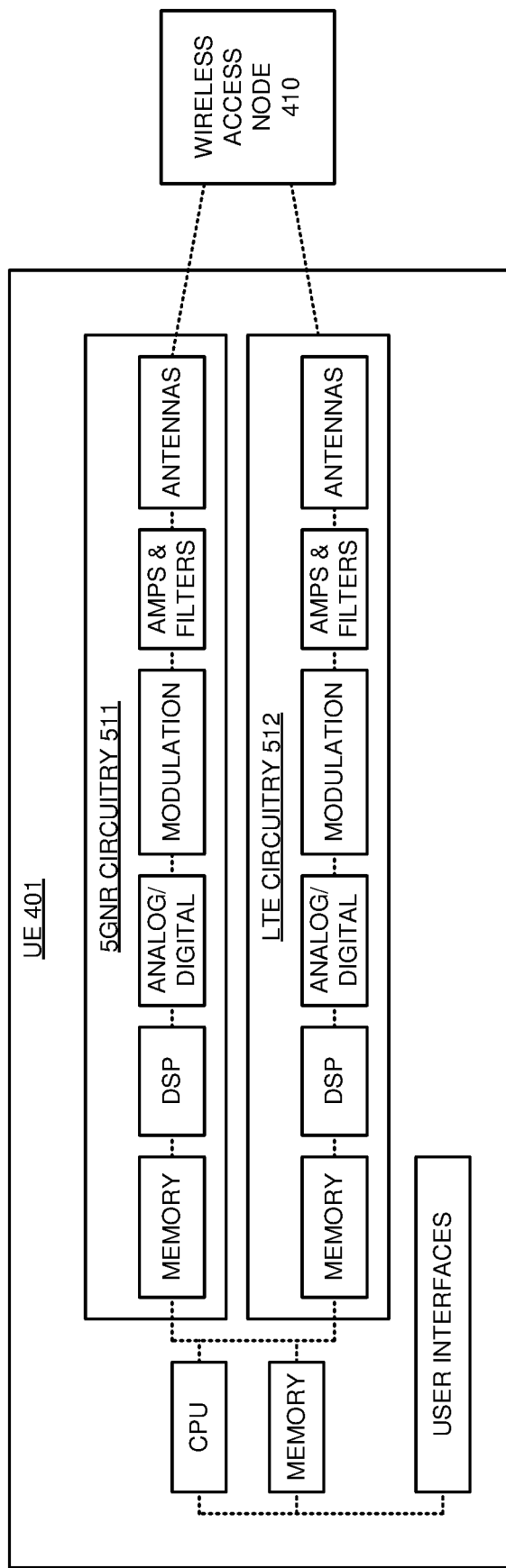
FIG. 5 illustrates one of the UEs that is served by the wireless access node with dynamic data splitting over 5GNR and LTE.

FIG. 5 illustrates one of UEs 401 that is served by wireless access node 410 with dynamic data splitting over 5GNR and LTE. UE 401 is an example of UEs 101, although UEs 101 may differ. UE 401 comprises 5GNR circuitry 511, LTE circuitry 512, CPU, memory, and user interfaces which are interconnected over bus circuitry. Circuitry 511-512 comprises antennas, amplifiers, filters, modulation, analog-to-digital interfaces, DSP, and memory that are coupled over bus circuitry. The antennas in UE 401 are coupled to wireless access node 410 over wireless 5GNR and LTE links. The user interfaces comprise graphic displays, machine controllers, sensors, cameras, transceivers, and/or some other user components. The memories store operating systems, user applications, and network applications. The network applications comprise PHY, MAC, RLC, PDCP, RRC, and SDAP. The CPU executes the operating systems, user applications, and network applications to exchange network signaling and user data with wireless access node 410 over circuitry 511-512 and the wireless 5GNR and LTE links.

Figure 6:
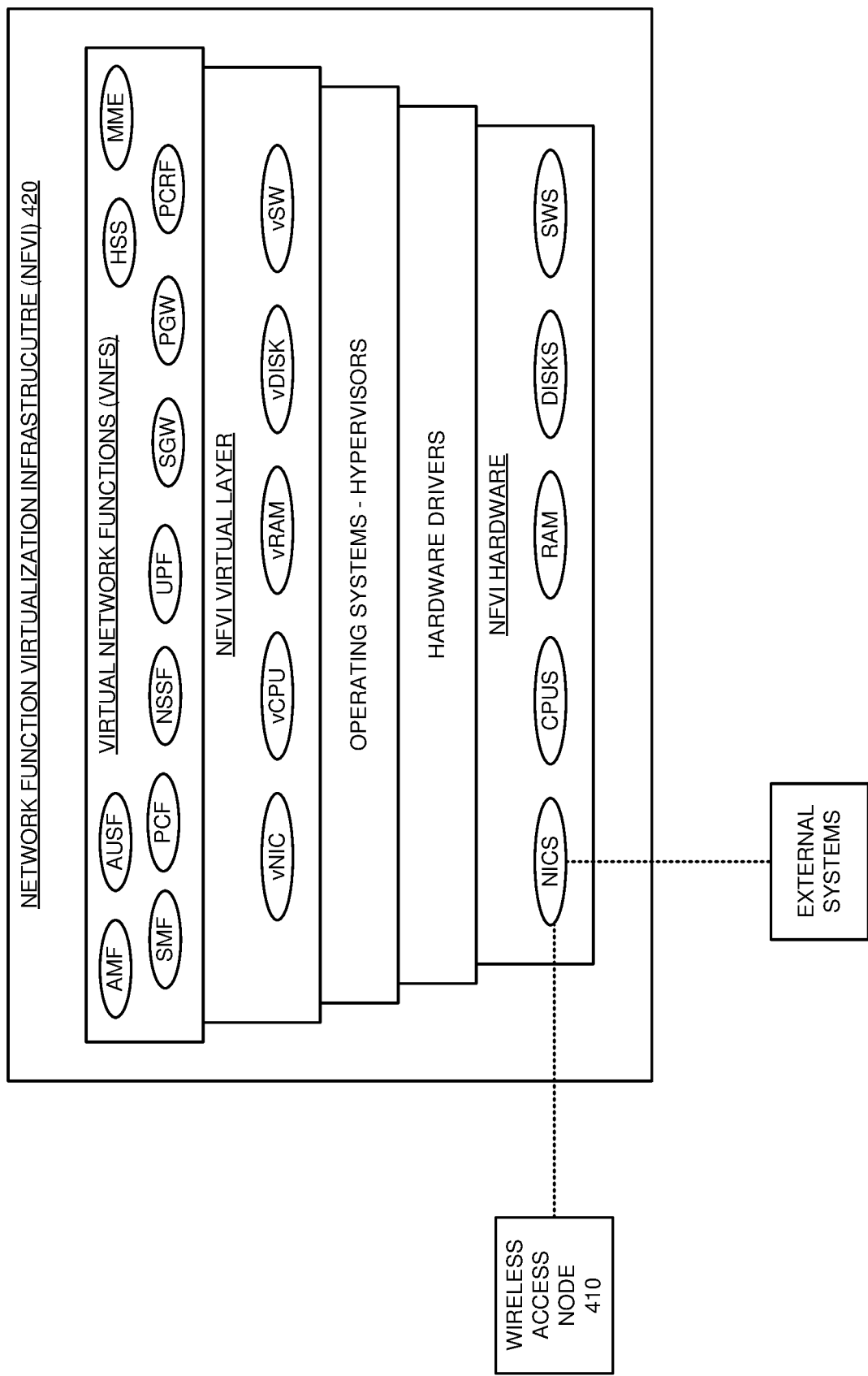
FIG. 6 illustrates a Network Function Virtualization Infrastructure (NFVI) to serve the UEs with dynamic data splitting over 5GNR and LTE.

FIG. 6 illustrates Network Function Virtualization Infrastructure (NFVI) 420 to serve UEs 401 with dynamic data splitting over 5GNR and LTE. NFVI 420 is an example of wireless network core 120, although network core 120 may differ. NFVI 420 comprises NFVI hardware, hardware drivers, operating systems and hypervisors, NFVI virtual layer, and Virtual Network Functions (VNFs). The NFVI hardware comprises Network Interface Cards (NICs), CPUs, RAM, disk storage, and data switches. The virtual layers comprise virtual NICs (vNIC), virtual CPUs (vCPU), virtual RAM (vRAM), virtual Disk Storage (vDISK), and virtual Switches (vSW). The VNFs comprise wireless network elements like Access and Mobility Management Function (AMF), Session Management Function (SMF), Policy Control Function (PCF), Authentication and Security Function (AUSF), Network Slice Selection Function (NSSF), User Plane Function (UPF), Mobility Management Entity (MME), Home Subscriber System (HSS), Serving Gateway (SGW), Packet Data Network Gateway (PGW), Policy Charging Rules Function (PCRF), or some other networking systems. The NFVI hardware executes the hardware drivers, operating systems/hypervisors, virtual layers, and VNFs to simultaneously serve UEs 401 over LTE and 5GNR.

Figure 7:
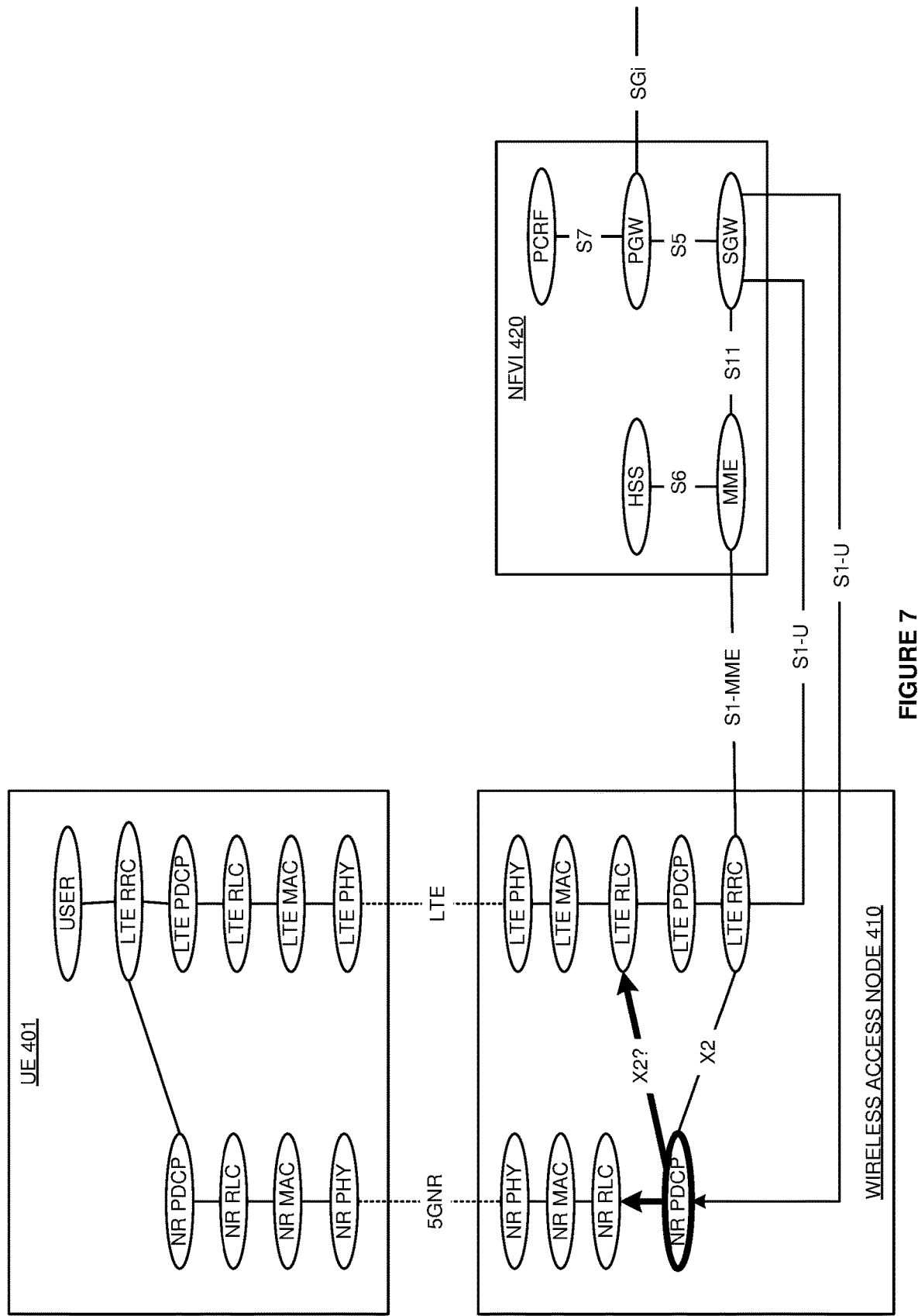
FIG. 7 illustrates the operation of the wireless access node and the NFVI to serve the UEs with dynamic data splitting over 5GNR and LTE using an LTE core.

FIG. 7 illustrates the operation of wireless access node 410 and NFVI 420 to serve UE 401 with dynamic data splitting over 5GNR and LTE using an LTE core. The LTE RRC in UE 401 and the LTE RRC in wireless access node 410 exchange attachment signaling over their respective PDCP, RLC, MAC, and PHY. The LTE RRC in access node 410 transfers attachment signaling like an Initial UE Message for UE 401 to the MME in NFVI 420. The attachment signaling indicates a simultaneous LTE/5GNR capability for UE 401.

The MME receives the attachment signaling and exchanges Non-Access Stratum (NAS) data with the RRC in UE 401 over access node 410 to perform UE authentication and UE security. The MME transfers a database request like an Update Location Request to the HSS that indicates a UE ID and the simultaneous LTE/5GNR capability for UE 401. The HSS authorizes UE 401 for simultaneous LTE/5GNR service. The HSS also yields one or more Access Point Names (APNs). The MME exchanges signaling with the SGW which exchanges signaling with the PGW. The PGW exchanges signaling with the PCRF that indicates the UE ID, APNs, simultaneous LTE/5GNR capability, and/or some other networking data. The PCRF selects one or more Quality-of-Service Class Indicators (QCIs) based on the signaling, and the selected QCI(s) are transferred back to the MME over the PGW and SGW. The MME transfers response signaling like an Initial Context Set-up Request to the LTE RRC in wireless access node 410 that indicates the network-selected APNs, QCIs, and the UE 401 authorization for simultaneous LTE/5GNR service.

The LTE RRC in access node 410 receives the response signaling and configures its LTE network applications to communicate with UE 401 and the SGW. The LTE RRC in access node 410 signals the 5GNR PDCP in access node 410 to configures its 5GNR network applications to communicate with UE 401 and the SGW. The LTE RRC in access node 410 transfers connection signaling like an RRC Connection Reconfiguration message to the RRC in UE 401 over their respective PDCP, RLC, MAC, and PHY that indicates the connection information. In UE 401, the LTE RRC configures its LTE network applications to communicate with access node 410. In UE 401, the LTE RRC signals the 5GNR PDCP to configure its 5GNR network applications to communicate with access node 410. The LTE RRC in access node 410 transfers connection signaling to the MME like Attach Complete/Bearer Accept NAS messaging. The MME directs the SGW to modify bearers that serve UE 401.

The PGW exchanges UL/DL user data for UE 401 with external systems over the SGi and with the SGW over the S5. The SGW exchanges some of the UL/DL user data with the LTE RRC in wireless access node 410 over the S1-U. The LTE RRC in access node 410 and the LTE RRC in UE 401 exchange this UL/DL user data over their respective PDCP, RLC, MAC, and PHY. In wireless access node 120, the LTE RRC determines X2 link occupancy and signals the X2 link occupancy values to the 5GNR PDCP over the X2 links.

The SGW also transfers some of the DL user data to the 5GNR PDCP in wireless access node 410 over another S1-U. The 5GNR PDCP receives the DL user data from the SGW. The 5GNR PDCP determines an LTE portion and a 5GNR portion of the DL user data. The 5GNR PDCP transfers the LTE portion of the DL user data to the LTE RLC in wireless access node 410 over X2 links. The LTE RLC in wireless access node 410 transfers the LTE portion of the DL user data to the LTE RRC in UE 401 over the LTE MAC, PHY, RLC, and PDCP, and the LTE RRC forwards the DL user data to the user applications. The 5GNR PDCP in wireless access node 410 transfers the 5GNR portion of the DL user data to the 5GNR RLC in wireless access node 410 over X2 links that are typically virtualized. The 5GNR RLC in wireless access node 410 transfers the 5GNR portion of the DL user data to the 5GNR PDCP in UE 401 over the 5GNR MAC, PHY, and RLC. The 5GNR PDCP in UE 401 forwards the DL user data to the user applications over the LTE RRC.

When X2 link occupancy is below an overload threshold (like 90%), the 5GNR PDCP splits the DL user data into LTE and 5GNR portions. When X2 link occupancy is above the overload threshold, the 5GNR PDCP does not split the DL user data into LTE and 5GNR portions and only uses 5GNR for the DL user data. Thus, the 5GNR PDCP transfers the DL user data to UE 401 over 5GNR links when the X2 link occupancy is overloaded. In some examples, the 5GNR PDCP stops splitting non-GBR data when X2 link quality is low, but the 5GNR PDCP continues to split GBR data even when the X2 link quality is low.

Figure 8:
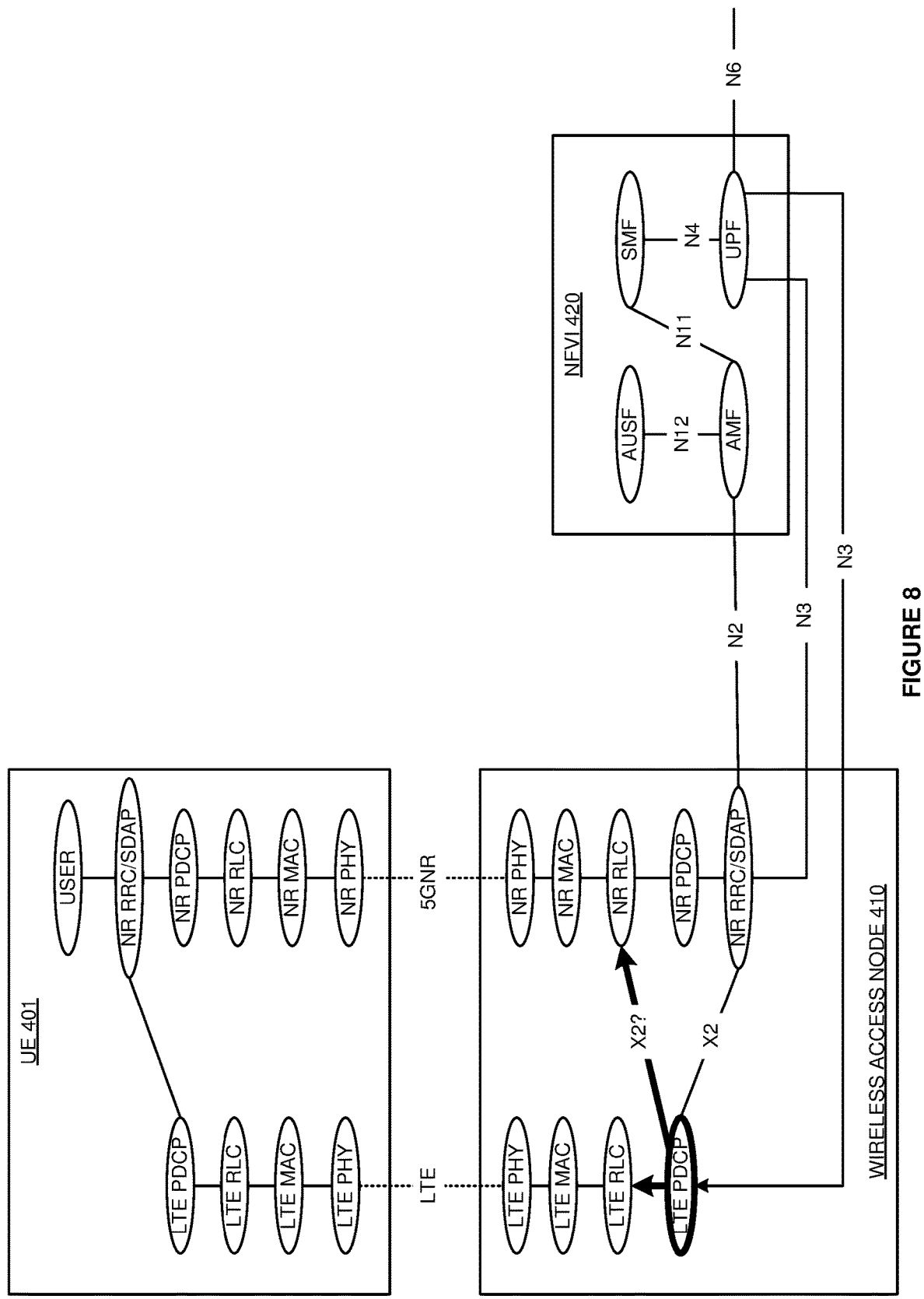
FIG. 8 illustrates the operation of the wireless access node and the NFVI to serve the UEs with dynamic data splitting over 5GNR and LTE using a 5G core.

FIG. 8 illustrates the operation of wireless access node 410 and the NFVI 420 to serve UEs 401 with dynamic data splitting over 5GNR and LTE using a 5G core. The 5GNR RRC in UE 401 and the 5GNR RRC in wireless access node 410 exchange attachment signaling over their respective PDCP, RLC, MAC, and PHY. The 5GNR RRC in access node 410 transfers attachment signaling for UE 401 to the AMF in NFVI 420. The attachment signaling indicates a simultaneous LTE/5GNR capability for UE 401.

The AMF receives the attachment signaling and exchanges N1 signaling with the RRC in UE 401 over access node 410 to perform UE authentication and UE security. The AMF transfers an attachment information for UE 401 to the AUSF that indicates a UE ID and the simultaneous LTE/5GNR capability for UE 401. The AUSF authorizes UE 401 for simultaneous LTE/5GNR service. The AMF exchanges attachment signaling with the SMF which exchanges signaling with the UPF. The AMF transfers response signaling to the 5GNR RRC in wireless access node 410 that indicates the UE 401 authorization for simultaneous LTE/5GNR service and other connection information.

The 5GNR RRC in access node 410 receives the response signaling and configures its 5GNR network applications to communicate with UE 401 and the UPF. The 5GNR RRC in access node 410 signals the LTE PDCP in access node 410 over the X2 links to configure its LTE network applications to communicate with UE 401 and the UPF. The 5GNR RRC in access node 410 transfers connection signaling to the RRC in UE 401 over their respective PDCP, RLC, MAC, and PHY that indicates the connection information. In UE 401, the 5GNR RRC configures its 5GNR network applications to communicate with access node 410. In UE 401, the 5GNR RRC signals the LTE PDCP to configure its LTE network applications to communicate with access node 410. The 5GNR RRC in access node 410 transfers connection signaling to the AMF and SMF like Attach Complete/Bearer Accept NAS messaging. The SMF directs the UPF to modify bearers that serve UE 401.

The UPF exchanges UL/DL user data for UE 401 with external systems and with the 5GNR SDAP in wireless access node 410. The 5GNR SDAP in access node 410 and the 5GNR SDAP in UE 401 exchange this UL/DL user data over their respective PDCP, RLC, MAC, and PHY. In wireless access node 120, the 5GNR RRC determines X2 link error rates and retransmissions and signals this information to the 5GNR PDCP. The UPF also transfers some of the DL user data to the LTE PDCP in wireless access node 410. The LTE PDCP receives the DL user data from the UPF. The LTE PDCP determines an 5GNR portion and an LTE portion of the DL user data. The 5GNR PDCP transfers the 5GNR portion of the DL user data to the 5GNR RLC in wireless access node 410. The 5GNR RLC in wireless access node 410 transfers the 5GNR portion of the DL user data to the 5GNR SDAP in UE 401 over the 5GNR MAC, PHY, RLC, and PDCP, and the SDAP forwards the DL user data to the user applications. The LTE PDCP in wireless access node 410 transfers the LTE portion of the DL user data to the LTE RLC in wireless access node 410. The LTE RLC in wireless access node 410 transfers the LTE portion of the DL user data to the LTE PDCP in UE 401 over the LTE MAC, PHY, and RLC. The LTE PDCP in UE 401 forwards the DL user data to the user applications over the 5GNR SDAP.

When X2 link error/retransmission rates are below an error threshold like 5%, then the 5GNR PDCP in wireless access node 410 splits the DL user data into LTE and 5GNR portions. When X2 link error/retransmission rates are above the error threshold, then the 5GNR PDCP does not split the DL user data into LTE and 5GNR portions and only uses 5GNR for the DL user data. Thus, the 5GNR PDCP transfers the DL user data to UE 401 over 5GNR links when the X2 link error/retransmission rates reaches the error threshold. In some examples, the 5GNR PDCP stops splitting non-GBR data when X2 link error/transmission rates are high, but the 5GNR PDCP still splits GBR data even when the X2 link error/transmission rates are high.

The wireless data network circuitry described above comprises computer hardware and software that form special-purpose wireless network circuitry to wirelessly serve UEs with dynamic data splitting over 5GNR and LTE. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless network circuitry to wirelessly serve UEs with dynamic data splitting over 5GNR and LTE.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve User Equipment (UEs) over Fifth Generation New Radio (5GNR) and Long Term Evolution (LTE), the method comprising:
   an LTE access node and a 5GNR access node exchanging first network signaling over X2 links;
   the 5GNR access node receiving first user data for wireless delivery to the UEs, splitting the first user data into a first LTE portion and a first 5GNR portion, transferring the first 5GNR portion of the user data to the UEs over wireless 5GNR links, and transferring the first LTE portion of the user data to the LTE access node over the X2 links;
   the LTE access node receiving the first LTE portion of the first user data over the X2 links and transferring the first LTE portion of the first user data to the UEs over wireless LTE links;
   the 5GNR access node identifying when X2 link status falls below a quality threshold, and when the X2 link status falls below the quality threshold, the 5GNR access node receiving second user data for wireless delivery to the UEs and transferring the second user data to the UEs over the wireless 5GNR links without splitting the second user data to LTE; and
   the LTE access node and the 5GNR access node exchanging second network signaling over X2 links when the X2 link status falls below the quality threshold.

2. The method of claim 1 further comprising:
   the 5GNR access node identifying when the X2 link status rises above the quality threshold, and when the X2 link status rises above the quality threshold, the 5GNR access node receiving third user data for wireless delivery to the UEs, splitting the third user data into a second LTE portion and a second 5GNR portion, transferring the second 5GNR portion of the third user data to the UEs over the wireless 5GNR links, and transferring the second LTE portion of the third user data to the LTE access node over the X2 links;
   the LTE access node receiving the second LTE portion of the third user data over the X2 links and transferring the second LTE portion of the third user data to the UEs over the wireless LTE links; and the LTE access node and the 5GNR access node exchanging third network signaling over X2 links after the X2 link status rises above the quality threshold.

3. The method of claim 1 wherein the 5GNR access node identifying when the X2 link status falls below the quality threshold comprises the LTE access node detecting when the X2 link status falls below the quality threshold and signaling the 5GNR access node that the X2 link status is below the quality threshold.

4. The method of claim 1 wherein the 5GNR access node identifying when the X2 link status falls below the quality threshold comprises identifying when X2 link occupancy rises above an occupancy threshold or when X2 link throughput rises above a throughput threshold.

5. The method of claim 1 wherein the 5GNR access node splitting the first user data and not splitting the second user data comprises a 5GNR Packet Data Convergence Protocol (PDCP) splitting the first user data and not splitting the second user data.

6. The method of claim 1 further comprising the LTE access node transferring signaling to a wireless network controller indicating that the 5GNR access node will not split the second user data.

7. The method of claim 1 wherein the second user data has a quality-of-service level and the 5GNR access node splitting the second user data comprises splitting the second user in response to both the quality-of-service level and the X2 link status below the quality threshold.

8. The method of claim 7 further comprising:
when the X2 link status is below the quality threshold, the 5GNR access node receiving third user data for wireless delivery to the UEs that has a different quality-of-service level, and responsive to the different quality-of-service level, the 5GNR access node splitting the third user data into a second LTE portion and a second 5GNR portion, transferring the second 5GNR portion of the third user data to the UEs over the wireless 5GNR links, and transferring the second LTE portion of the third user data to the LTE access node over the X2 links; and
the LTE access node receiving the second LTE portion of the third user data over the X2 links and transferring the second LTE portion of the third user data to the UEs over the wireless LTE links.

9. The method of claim 1 wherein the second user data has a non-Guaranteed Bit Rate (non-GBR) service level and the 5GNR access node splitting the second user data comprises splitting the second user in response to both the non-GBR service level and the X2 link status below the quality threshold.

10. The method of claim 9 further comprising:
when the X2 link status is below the quality threshold, the 5GNR access node receiving third user data for wireless delivery to the UEs that has a Guaranteed Bit Rate (GBR) service level, and responsive to the GBR service level, the 5GNR access node splitting the third user data into a second LTE portion and a second 5GNR portion, transferring the second 5GNR portion of the third user data to the UEs over the wireless 5GNR links, and transferring the second LTE portion of the third user data to the LTE access node over the X2 links; and
the LTE access node receiving the second LTE portion of the third user data over the X2 links and transferring the second LTE portion of the third user data to the UEs over the wireless LTE links.

11. A wireless communication network to serve User Equipment (UEs) over Fifth Generation New Radio (5GNR) and Long Term Evolution (LTE), the wireless communication network comprising:
an LTE access node and a 5GNR access node configured to exchange first network signaling over X2 links;
the 5GNR access node configured to receive first user data for wireless delivery to the UEs, split the first user data into a first LTE portion and a first 5GNR portion, transfer the first 5GNR portion of the user data to the UEs over wireless 5GNR links, and transfer the first LTE portion of the user data to the LTE access node over the X2 links;
the LTE access node configured to receive the first LTE portion of the first user data over the X2 links and transfer the first LTE portion of the first user data to the UEs over wireless LTE links;
the 5GNR access node configured to identify when X2 link status falls below a quality threshold, and when the X2 link status falls below the quality threshold, the 5GNR access node configured to receive second user data for wireless delivery to the UEs and transfer the second user data to the UEs over the wireless 5GNR links without splitting the second user data to LTE; and
the LTE access node and the 5GNR access node configured to exchange second network signaling over X2 links when the X2 link status falls below the quality threshold.

12. The method of claim 11 further comprising:
the 5GNR access node is configured to identify when the X2 link status rises above the quality threshold, and when the X2 link status rises above the quality threshold, the 5GNR access node configured to receive third user data for wireless delivery to the UEs, split the third user data into a second LTE portion and a second 5GNR portion, transfer the second 5GNR portion of the third user data to the UEs over the wireless 5GNR links, and transfer the second LTE portion of the third user data to the LTE access node over the X2 links;
the LTE access node is configured to receive the second LTE portion of the third user data over the X2 links and transfer the second LTE portion of the third user data to the UEs over the wireless LTE links; and
the LTE access node and the 5GNR access node are configured to exchange third network signaling over X2 links after the X2 link status rises above the quality threshold.

13. The wireless communication network of claim 11 wherein the LTE access node is configured to detect when the X2 link status falls below the quality threshold and signal the 5GNR access node that the X2 link status is below the quality threshold.

14. The wireless communication network of claim 11 wherein the 5GNR access node is configured to identify when X2 link occupancy rises above an occupancy threshold or when X2 link throughput rises above a throughput threshold.

15. The wireless communication network of claim 11 wherein the 5GNR access node comprises a 5GNR Packet Data Convergence Protocol (PDCP) that is configured to split the first user data and to not split the second user data.

16. The wireless communication network of claim 11 further comprising the LTE access node configured to transfer signaling to a wireless network controller indicating that the 5GNR access node will not split the second user data.

17. The wireless communication network of claim 11 wherein the second user data has a quality-of-service level and the 5GNR access node is configured to split the second user in response to both the quality-of-service level and the X2 link status below the quality threshold.

18. The wireless communication network of claim 17 further comprising:
when the X2 link status is below the quality threshold, the 5GNR access node is configured to receive third user data for wireless delivery to the UEs that has a different quality-of-service level, and responsive to the different quality-of-service level, the 5GNR access node is configured to split the third user data into a second LTE portion and a second 5GNR portion, transfer the second 5GNR portion of the third user data to the UEs over the wireless 5GNR links, and transfer the second LTE portion of the third user data to the LTE access node over the X2 links; and
the LTE access node is configured to receive the second LTE portion of the third user data over the X2 links and transfer the second LTE portion of the third user data to the UEs over the wireless LTE links.

19. The wireless communication network of claim 11 wherein the second user data has a non-Guaranteed Bit Rate (non-GBR) service level and the 5GNR access node is configured to split the second user in response to both the non-GBR service level and the X2 link status below the quality threshold.

20. The wireless communication network of claim 19 further comprising:
when the X2 link status is below the quality threshold, the 5GNR access node is configured to receive third user data for wireless delivery to the UEs that has a Guaranteed Bit Rate (GBR) service level, and responsive to the GBR service level, the 5GNR access node is configured to split the third user data into a second LTE portion and a second 5GNR portion, transfer the second 5GNR portion of the third user data to the UEs over the wireless 5GNR links, and transfer the second LTE portion of the third user data to the LTE access node over the X2 links; and
the LTE access node is configured to receive the second LTE portion of the third user data over the X2 links and transfer the second LTE portion of the third user data to the UEs over the wireless LTE links.

\* \* \* \* \*